(12) United States Patent
Burgmeier et al.

(10) Patent No.: US 10,874,113 B1
(45) Date of Patent: Dec. 29, 2020

(54) METHOD OF PRODUCING BACTERIA REDUCED RAW, FRESH, GROUND MEAT PRODUCTS

(71) Applicant: HORMEL FOODS CORPORATION, Austin, MN (US)

(72) Inventors: Marilla Rose Burgmeier, Atwater, MN (US); Steven D. Leitch, Willmar, MN (US)

(73) Assignee: Hormel Foods Corporation, Austin, MN (US)

( * ) Notice: Subject to any disclaimer, the term of this patent is extended or adjusted under 35 U.S.C. 154(b) by 123 days.

(21) Appl. No.: 15/018,028

(22) Filed: Feb. 8, 2016

(51) Int. Cl.
- *A23B 4/14* (2006.01)
- *A23L 1/317* (2006.01)
- *A23L 1/312* (2006.01)

(52) U.S. Cl.
CPC ............. *A23B 4/14* (2013.01); *A23L 1/312* (2013.01); *A23L 1/317* (2013.01); *A23V 2002/00* (2013.01)

(58) Field of Classification Search
CPC ........... A23B 4/14; A23L 1/312; A23L 1/317; A23V 2002/00
USPC ....... 426/302, 310, 321, 331, 332, 531, 532, 426/541, 544, 641, 644, 646, 647, 521
See application file for complete search history.

(56) References Cited

U.S. PATENT DOCUMENTS

| | | |
|---|---|---|
| 5,458,901 A | 10/1995 | Engler et al. |
| 6,086,936 A | 7/2000 | Wilson et al. |
| 6,110,516 A | 8/2000 | Hoover et al. |
| 8,383,177 B2 | 2/2013 | Marsden et al. |
| 2002/0006465 A1 | 1/2002 | Voisin |
| 2003/0170356 A1 | 9/2003 | Yuan et al. |
| 2004/0033296 A1 | 2/2004 | Yuan et al. |
| 2004/0058041 A1 | 3/2004 | Greenwald |
| 2006/0024414 A1 | 2/2006 | Turek et al. |
| 2007/0237865 A1 | 10/2007 | Love et al. |
| 2008/0050507 A1 | 2/2008 | Jaehnert |
| 2009/0214731 A1 | 8/2009 | Ormond et al. |
| 2012/0027898 A1 | 2/2012 | Misawa et al. |
| 2012/0269952 A1 | 10/2012 | Parker et al. |
| 2012/0269953 A1 | 10/2012 | Parker et al. |
| 2013/0059037 A1 | 3/2013 | Heinz et al. |
| 2013/0078339 A1 | 3/2013 | Trahan et al. |
| 2013/0183420 A1 | 7/2013 | Shimek et al. |
| 2013/0209634 A1 | 8/2013 | Lanzrath et al. |
| 2014/0010932 A1 | 1/2014 | Freybe |

FOREIGN PATENT DOCUMENTS

| | | |
|---|---|---|
| AU | 2010212359 | 9/2011 |
| WO | 03013279 | 2/2003 |

OTHER PUBLICATIONS

Hayes et al., "Consumer Acceptability of High Hydrostatic Pressure (HHP) Treated Ground Beef Patties," LWT—Food Science and Technology, Apr. 2014, pp. 207-210, vol. 56, Issue 1, Elsevier B.V., Amsterdam.

*Primary Examiner* — Leslie A Wong
(74) *Attorney, Agent, or Firm* — Dicke, Billig & Czaja, PLLC

(57) ABSTRACT

A method of producing bacteria reduced raw, fresh, ground meat products comprises obtaining a first portion of meat and a second portion of meat. The first portion is treated with a treatment selected from the group consisting of grinding the first portion to create a ground first portion and then treating the ground first portion with HPP, and treating the first portion with HPP to create a HPP'd first portion and then grinding the HPP'd first portion. The second portion is treated with a suitable chemical, and then the second portion is ground. The first portion and the second portion are combined to create a bacteria reduced raw, fresh, ground meat product.

15 Claims, 9 Drawing Sheets

(5 of 9 Drawing Sheet(s) Filed in Color)

Figure 6

250ppm PAA Dip Skinless Drumette for 15 and 30 Seconds and HPP'd Drumette Skin for three, 30 second cycles at 450 MPa

| | | | | Skinless Drumette | | | | | | | | |
|---|---|---|---|---|---|---|---|---|---|---|---|---|
| | | | | Control | | | 15 Sec | | | 30 Sec | | |
| Date | Flock # | Salmonella PCR | Flock Status | Prevalence % | n | # pos | Prevalence % | n | # pos | Prevalence % | n | # pos |
| Average Prevalence | | | | 16.2% | n=99 | | 13.0% | n=100 | | 7.0% | n=100 | |
| 10/1/2014 | 108548 | 2 | Negative | 10% | 10 | 1 | 10% | 10 | 1 | 0% | 10 | 0 |
| 10/7/2014 | 110337 | 700 | Positive | 11% | 9 | 1 | 0% | 10 | 0 | 0% | 10 | 0 |
| 10/8/2014 | 110339 | 6 | Negative | 0% | 10 | 0 | 0% | 10 | 0 | 0% | 10 | 0 |
| 10/9/2014 | 114435 | 2,000 | Positive | 60% | 10 | 6 | 40% | 10 | 4 | 20% | 10 | 2 |
| 10/10/2014 | 114437 | 1,000 | Positive | 30% | 10 | 3 | 30% | 10 | 3 | 10% | 10 | 1 |
| 10/14/2014 | 113493 | 1 | Negative | 0% | 10 | 0 | 0% | 10 | 0 | 0% | 10 | 0 |
| 10/15/2014 | 108357 | 0 | Negative | 30% | 10 | 3 | 0% | 10 | 0 | 10% | 10 | 1 |
| 11/11/2014 | 108835 | 44,000 | Positive | 10% | 10 | 1 | 40% | 10 | 4 | 30% | 10 | 3 |
| 11/12/2014 | 110374 | 6,300 | Positive | 10% | 10 | 1 | 10% | 10 | 1 | 0% | 10 | 0 |
| 11/14/2014 | 110749 | 0 | Negative | 0% | 10 | 0 | 0% | 10 | 0 | 0% | 10 | 0 |

Figure 6 (Continued)

250ppm PAA Dip Skinless Drumette for 15 and 30 Seconds and HPP'd Drumette Skin for three, 30 second cycles at 450 MPa

| Date | Flock # | Salmonella PCR | Flock Status | Control Prevalence % | Control n | Control # pos | Drumette Skin Prevalence % | Drumette Skin n | Drumette Skin # pos | HPP Skin Prevalence % | HPP Skin n | HPP Skin # pos |
|---|---|---|---|---|---|---|---|---|---|---|---|---|
| Average Prevalence | | | | 12.0% | n=100 | | | n=100 | | 0.0% | n=100 | |
| 10/1/2014 | 108548 | 2 | Negative | 20% | 10 | 2 | | 10 | 2 | 0% | 10 | 0 |
| 10/7/2014 | 110337 | 700 | Positive | 0% | 10 | 0 | | 10 | 0 | 0% | 10 | 0 |
| 10/8/2014 | 110339 | 6 | Negative | 0% | 10 | 0 | | 10 | 2 | 0% | 10 | 0 |
| 10/9/2014 | 114435 | 2,000 | Positive | 20% | 10 | 2 | | 10 | 4 | 0% | 10 | 0 |
| 10/10/2014 | 114437 | 1,000 | Positive | 40% | 10 | 4 | | 10 | 1 | 0% | 10 | 0 |
| 10/14/2014 | 113493 | 1 | Negative | 10% | 10 | 1 | | 10 | 0 | 0% | 10 | 0 |
| 10/15/2014 | 108357 | 0 | Negative | 0% | 10 | 0 | | 10 | 3 | 0% | 10 | 0 |
| 11/11/2014 | 108835 | 44,000 | Positive | 30% | 10 | 3 | | 10 | 0 | 0% | 10 | 0 |
| 11/12/2014 | 110374 | 6,300 | Positive | 0% | 10 | 0 | | 10 | 0 | 0% | 10 | 0 |
| 11/14/2014 | 110749 | 0 | Negative | 0% | 10 | 0 | | 10 | 0 | 0% | 10 | 0 |

Figure 7

250ppm PAA Dip Skinless Drum for 15 and 30 Seconds and HPP'd Drum Skin for three, 30 second cycles at 450 MPa

| | | | | | Control | | | | Skinless Drum | | | | | |
|---|---|---|---|---|---|---|---|---|---|---|---|---|---|---|
| | | | | | | | | | 15 Sec | | | | 30 Sec | | |
| Date | Flock # | Salmonella PCR | Flock Status | Prevalence % | n | # pos | Prevalence % | n | # pos | Prevalence % | n | # pos |
| | Average Prevalence | | | 12.0% | n=100 | | 7.0% | n=100 | | 11.0% | n=100 | |
| 10/1/2014 | 108548 | 2 | Negative | 0% | 10 | 0 | 10% | 10 | 1 | 0% | 10 | 0 |
| 10/7/2014 | 110337 | 700 | Positive | 0% | 10 | 0 | 0% | 10 | 0 | 0% | 10 | 0 |
| 10/8/2014 | 110339 | 6 | Negative | 10% | 10 | 1 | 10% | 10 | 1 | 0% | 10 | 0 |
| 10/9/2014 | 114435 | 2,000 | Positive | 80% | 10 | 8 | 30% | 10 | 3 | 50% | 10 | 5 |
| 10/10/2014 | 114437 | 1,000 | Positive | 10% | 10 | 1 | 0% | 10 | 0 | 0% | 10 | 0 |
| 10/14/2014 | 113493 | 1 | Negative | 0% | 10 | 0 | 0% | 10 | 0 | 0% | 10 | 0 |
| 10/15/2014 | 108357 | 0 | Negative | 10% | 10 | 1 | 10% | 10 | 1 | 30% | 10 | 3 |
| 11/11/2014 | 108835 | 44,000 | Positive | 0% | 10 | 0 | 0% | 10 | 0 | 20% | 10 | 2 |
| 11/12/2014 | 110374 | 6,300 | Positive | 10% | 10 | 1 | 10% | 10 | 1 | 10% | 10 | 1 |
| 11/14/2014 | 110749 | 0 | Negative | 0% | 10 | 0 | 0% | 10 | 0 | 0% | 10 | 0 |

Figure 7 (Continued)

250ppm PAA Dip Skinless Drum for 15 and 30 Seconds and HPP'd Drum Skin for three, 30 second cycles at 450 MPa

| | | | | | Drum Skin | | | HPP Skin | | |
|---|---|---|---|---|---|---|---|---|---|---|
| | | | | | Control | | | | | |
| Date | Flock # | Salmonella PCR | Flock Status | Prevalence % | n | # pos | Prevalence % | n | # pos | |
| Average Prevalence | | | | 15.0% | n=100 | | 1.0% | n=100 | | |
| 10/1/2014 | 108548 | 2 | Negative | 30% | 10 | 3 | 0% | 10 | 0 | |
| 10/7/2014 | 110337 | 700 | Positive | 0% | 10 | 0 | 0% | 10 | 0 | |
| 10/8/2014 | 110339 | 6 | Negative | 0% | 10 | 0 | 0% | 10 | 0 | |
| 10/9/2014 | 114435 | 2,000 | Positive | 50% | 10 | 5 | 0% | 10 | 0 | |
| 10/10/2014 | 114437 | 1,000 | Positive | 30% | 10 | 3 | 10% | 10 | 1 | |
| 10/14/2014 | 113493 | 1 | Negative | 0% | 10 | 0 | 0% | 10 | 0 | |
| 10/15/2014 | 108357 | 0 | Negative | 20% | 10 | 2 | 0% | 10 | 0 | |
| 11/11/2014 | 108835 | 44,000 | Positive | 20% | 10 | 2 | 0% | 10 | 0 | |
| 11/12/2014 | 110374 | 6,300 | Positive | 0% | 10 | 0 | 0% | 10 | 0 | |
| 11/14/2014 | 110749 | 0 | Negative | 0% | 10 | 0 | 0% | 10 | 0 | |

METHOD OF PRODUCING BACTERIA REDUCED RAW, FRESH, GROUND MEAT PRODUCTS

BACKGROUND OF THE INVENTION

As background, high pressure pasteurization ("HPP") drastically changes the color, texture, and moisture content of some types of raw meat, such as raw, fresh, ground turkey meat, because it denatures the protein in the meat. This is especially true for white turkey meat, which becomes tough/chewy. Chemical treatments impart minimal impact on color and texture of raw meat, however, bacterial reduction is minimal compared to HPP. Therefore, there is a need for an improved treatment to reduce bacteria in raw, fresh, ground meat while maintaining quality and reducing loss of yield.

For the reasons stated above and for other reasons stated below, which will become apparent to those skilled in the art upon reading and understanding the present specification, there is a need in the art for a method of producing bacteria reduced raw, fresh, ground meat products.

BRIEF SUMMARY OF THE INVENTION

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, a method of producing bacteria reduced raw, fresh, ground meat products comprises obtaining a first portion of meat and a second portion of meat. The first portion is treated with a treatment selected from the group consisting of grinding the first portion to create a ground first portion and then treating the ground first portion with HPP, and treating the first portion with HPP to create a HPP'd first portion and then grinding the HPP'd first portion. The second portion is treated with a suitable chemical, and then the second portion is ground. The first portion and the second portion are combined to create a bacteria reduced raw, fresh, ground meat product.

In one embodiment, a method of producing bacteria reduced raw, fresh, ground fowl meat products, the fowl meat including meat including wings, drums, and thighs that are skinned to create skin and skinless parts, comprises obtaining a first portion of fowl meat and a second portion of fowl meat, wherein the first portion includes skin and trimmed wing meat and the second portion includes skinless parts. The first portion is treated with a treatment selected from the group consisting of grinding the first portion to create a ground first portion and then treating the ground first portion with HPP, and treating the first portion with HPP to create a HPP'd first portion and then grinding the HPP'd first portion. The second portion is treated with a suitable chemical, and then the second portion is ground. The first portion and the second portion are combined to create a bacteria reduced raw, fresh, ground fowl meat product.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention can be more easily understood, and further advantages and uses thereof can be more readily apparent, when considered in view of the detailed description and the following Figures in which:

FIG. 6 shows the efficacy of a 250 ppm PAA dip for 15 seconds and 30 seconds for skinless drumettes and HPP for drumette skin in reducing *Salmonella*; and FIG. 7 shows the efficacy of a 250 ppm PAA dip for 15 seconds and 30 seconds for skinless drums and HPP for drums skin in reducing *Salmonella*.

In accordance with common practice, the various described features are not drawn to scale but are drawn to emphasize specific features relevant to the present invention. Reference characters denote like elements throughout the Figures and the text.

DETAILED DESCRIPTION OF THE INVENTION

Figure 1:
FIG. 1 is a color photo showing the control for ground robbed wing (left), the ground robbed wing (middle), and the whole (not ground) robbed wing (right) all before being HPP'd.

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

Embodiments of the present invention provide a method of producing bacteria reduced raw, fresh, ground meat products. The term "fresh" means the meat has not been frozen. It is understood that the term "ground meat" could also include "comminuted meat" and these terms could be used interchangeably. The problem to be solved is significantly reducing the amount of bacteria in raw, fresh, ground meat products while maintaining the color, texture, and moisture content of the products and reducing loss of yield. It is recognized that meat products could include meat and other components such as, but not limited to, skin. For ground meat products, any components could be included that are commonly included in ground meat products (e.g., meat, skin, and fat). Types of meat that could be used include turkey, chicken, duck, goose, pheasant, other types of fowl, beef, pork, lamb, alligator, and other suitable types of meat.

For raw, fresh, ground turkey meat products, areas of the bird that are difficult to effectively treat chemically for bacteria include skin (e.g., feather follicles and areas with fat/collagen) and trimmed wing meat. Such areas contain minimal amounts of functional meat protein and, therefore, are less susceptible to being denatured by HPP. In this embodiment, the invention is utilized to treat the skin and trimmed wing meat with HPP, treat other areas with a suitable chemical treatment, and combine the two differently treated components together.

For example, the portions treated with HPP could be placed in a sealed bag and then subjected to 450 to 600 MPa for 0.5 to 6.0 minutes.

For example, for the portions treated with chemicals, the chemicals could be sprayed or otherwise applied onto the portions or the portions could be dipped, tumbled, vacuum tumbled, agitated, steamed, or massaged with the chemicals.

Although *Salmonella* is an example of a type of bacteria that could be reduced, other types of bacteria could be reduced, too, using the HPP process and the chemical treatment. The particular type of chemical treatment used is not important to the invention. Generally, it is the combination of HPP treated portions with chemically treated portions to create bacteria reduced meat products that is an aspect of the invention. Generally, the concern is pathogenic bacteria such as but not limited to *E. coli* O157 H7, non O157 H7 STEC, and *Salmonella* that are considered adulterants in ground meat or have a performance standard associated with them. Examples of chemicals that could be used include but are not limited to chlorine solutions, pH adjusted chlorine solutions, lactic acid solutions, peroxyacetic acid solutions, bromine solutions, and acetic acid solutions.

For raw, fresh ground turkey meat products, the method includes skinning raw turkey parts (e.g., breast, wings, drums, and thighs). The skin and trimmed wing meat (robbed wing) are treated with HPP and the skinless parts are treated with a desired chemical to reduce any bacterial contamination. Preferably, the skinless parts are treated immediately after skinning to limit attachment of any bacteria that may re-contaminate the parts after skinning. The HPP treated parts and the chemically treated parts are blended together and then ground, resulting in a product that is visibly comparable to typical raw, fresh, ground turkey meat but with a significant reduction in the levels of bacteria and pathogenic bacteria.

Example 1

A test was conducted to evaluate the color and efficacy of HPP'd drumette skin and robbed wing mixed with skinless drumette on *Salmonella* reduction.

The materials listed in Table 1 were used.

TABLE 1

| Materials Used | |
| --- | --- |
| Quantity | Material |
| 200 pounds | Punched Drumette |
| 100 pounds | Robbed Wing |
|  | Knife |

TABLE 1-continued

| Materials Used | |
| --- | --- |
| Quantity | Material |
|  | Cutting Board |
|  | Grinder |
|  | Small Blender |
|  | Spatula |
|  | Dry Ice |
|  | Strainer for Dry Ice |
|  | HPP Unit |
|  | PPE: cutting glove, scabbard, gloves |

Two sets of tests were conducted. The first test was for post-ground HPP'ing and the second test was for pre-ground HPP'ing.

In the first test, test samples included 1) two HPP'd robbed wings per one HPP'd drumette skin; 2) HPP'd robbed wing only; and 3) two HPP'd robbed wing per one HPP'd drumette skin per one skinless drumette (not HPP'd).

Control samples included 1) two robbed wings per one drumette skin (all not HPP'd); 2) robbed wing only (all not HPP'd); and 3) two robbed wing per one drumette skin per one skinless drumette (all not HPP'd).

200 pounds of punched drumette and 100 pounds of robbed wing meat were obtained from Plant #4. The punched drumette was skinned by cutting the punched drumette in half and filleting the skin from the drumette. The knife and gloves were sanitized after cutting the drumette and after filleting the skin. The drumette skin and robbed wing or robbed wing only were placed in bags to total 15 pounds each and vacuum sealed for HPP'ing. The test samples were pulsed HPP'd three times at 400 MPa for 30 seconds. The meat was ground after HPP'ing. The test samples and the control samples were ground separately using a ⅛ inch plate. The grinder was cleaned and sanitized between each sample. Dry ice was applied to the drumette skin and robbed wing to prevent clogging in the grinder. Each sample was blended for 3 minutes.

In the second test, test samples included 1) two HPP'd robbed wings per one HPP'd drumette skin; 2) HPP'd robbed wing only; and 3) two HPP'd robbed wing per one HPP'd drumette skin per one skinless drumette (not HPP'd).

Control samples included 1) two robbed wings per one drumette skin (all not HPP'd); 2) robbed wing only (all not HPP'd); and 3) two robbed wing per one drumette skin per one skinless drumette (all not HPP'd).

200 pounds of punched drumette and 100 pounds of robbed wing meat were obtained from Plant #4. The punched drumette was skinned by cutting the punched drumette in half and filleting the skin from the drumette. The knife and gloves were sanitized after cutting the drumette and after filleting the skin. The meat was ground before HPP'ing. The test samples and the control samples were ground separately using a ⅛ inch plate. The grinder was cleaned and sanitized between each sample. Dry ice was applied to the drumette skin and robbed wing to prevent clogging in the grinder. The test samples were placed in bags to total 15 pounds each and vacuum sealed for HPP'ing. The test samples were pulsed HPP'd three times at 400 MPa for 30 seconds. Each sample was blended for 3 minutes.

Figure 2:
FIG. 2 is a color photo showing the whole (not ground) robbed wing after being HPP'd (left), the ground robbed wing after being HPP'd (middle), and the control for ground robbed wing (not HPP'd) (right)
Figure 3:
FIG. 3 is a color photo showing the control for ground robbed wing and drumette skin (left), the ground robbed wing and drumette skin (middle), and the whole (not ground) robbed wing and drumette skin (right) all before being HPP'd.
Figure 4:
FIG. 4 is a color photo showing the whole (not ground) robbed wing and drumette skin after being HPP'd (left), the ground robbed wing and drumette skin after being HPP'd (middle), and the control fro ground robbed wing and drumette skin (not HPP'd) (right)
Figure 5:
FIG. 5 is a color photo showing the control for ground 2 parts robbed wing per 1 part drumette skin mixed with 1 part chemically treated ground skinless drumette all not HPP'd (left), 2 parts robbed wing ground before HPP'd per 1 part drumette skin ground before HPP'd mixed with 1 part chemically treated ground skinless drumette not HPP'd (middle), and 2 parts robbed wing ground after HPP'd per 1 part drumette skin ground after HPP'd mixed with 1 part chemically treated ground skinless drumette not HPP'd.

The first and second tests, post-ground HPP'ing and pre-ground HPP'ing, were conducted primarily to show any color differences that may occur after being blended with non-HPP'd skinless drumette. The results are shown in FIGS. 1-5. FIG. 1 shows color photos of the control for ground robbed wing (left), the ground robbed wing (middle), and the whole (not ground) robbed wing (right) all before being HPP'd. FIG. 2 shows color photos of the whole (not ground) robbed wing after being HPP'd (left), the ground robbed wing after being HPP'd (middle), and the control for ground robbed wing (not HPP'd) (right). FIG. 3 shows color photos of the control for ground robbed wing and drumette skin (left), the ground robbed wing and drumette skin (middle), and the whole (not ground) robbed wing and drumette skin (right) all before being HPP'd. FIG. 4 shows color photos of the whole (not ground) robbed wing and drumette skin after being HPP'd (left), the ground robbed wing and drumette skin after being HPP'd (middle), and the control fro ground robbed wing and drumette skin (not HPP'd) (right). FIG. 5 shows color photos of the control for ground 2 parts robbed wing per 1 part drumette skin mixed with 1 part chemically treated ground skinless drumette all not HPP'd (left), 2 parts robbed wing ground before HPP'd per 1 part drumette skin ground before HPP'd mixed with 1 part chemically treated ground skinless drumette not HPP'd (middle), and 2 parts robbed wing ground after HPP'd per 1 part drumette skin ground after HPP'd mixed with 1 part chemically treated ground skinless drumette not HPP'd.

For each of the first and second tests, ten control 325 g *Salmonella* Roka samples were sent to a lab for analysis for each of the following: robbed wing and drumette skin (no drumette), and robbed wing (no drumette skin or drumette); and ten test 325 g *Salmonella* Roka samples were sent to a lab for analysis for each of the following: robbed wing and drumette skin (no drumette), and robbed wing (no drumette skin or drumette).

For each of the first and second tests, Fat, Protein, and Moisture analysis was conducted on the robbed wing (only) and the robbed wing and drumette skin (no drumette) for both test and control.

For ease of comparison, results from the first and second tests are shown in Tables 2-7. For Tables 2 and 3, the test number indicates the test number for each type of sample, not that the same test was conducted for each type of sample.

TABLE 2

*Salmonella* Roka Lab Analysis for Robbed
Wing and Drumette Skin (No Drumette)

| Test | Control Results | Pre-Ground Test Results | Post-Ground Test Results |
|---|---|---|---|
| 1 | Negative | Negative | Negative |
| 2 | Negative | Negative | Negative |
| 3 | Negative | Positive | Negative |
| 4 | Negative | Negative | Negative |
| 5 | Negative | Negative | Negative |
| 6 | Positive | Negative | Negative |
| 7 | Negative | Negative | Negative |
| 8 | Negative | Negative | Negative |
| 9 | Negative | Negative | Negative |
| 10 | Negative | Negative | Negative |

TABLE 3

*Salmonella* Roka Lab Analysis for
Robbed Wing (No Drumette Skin or Drumette)

| Test | Control Results | Pre-Ground Test Results | Post-Ground Test Results |
|---|---|---|---|
| 1 | Negative | Negative | Negative |
| 2 | Negative | Negative | Negative |
| 3 | Negative | Negative | Negative |
| 4 | Negative | Negative | Negative |

TABLE 3-continued

*Salmonella* Roka Lab Analysis for
Robbed Wing (No Drumette Skin or Drumette)

| Test | Control Results | Pre-Ground Test Results | Post-Ground Test Results |
|---|---|---|---|
| 5 | Negative | Negative | Negative |
| 6 | Negative | Negative | Negative |
| 7 | Negative | Negative | Negative |
| 8 | Negative | Negative | Negative |
| 9 | Negative | Negative | Negative |
| 10 | Negative | Negative | Negative |

TABLE 4

Analysis of Test Robbed Wing (Only)

| Test | Percentage |
|---|---|
| Fat | 2.64 |
| Protein | 21.31 |
| Moisture | 75.24 |

TABLE 5

Analysis of Control Robbed Wing (Only)

| Test | Percentage |
|---|---|
| Fat | 4.29 |
| Protein | 21.76 |
| Moisture | 74.89 |

TABLE 6

Analysis of Test Robbed Wing and
Drumette Skin (No Drumette)

| Test | Percentage |
|---|---|
| Fat | 7.92 |
| Protein | 18.54 |
| Moisture | 72.64 |

TABLE 7

Analysis of Control Robbed Wing and
Drumette Skin (No Drumette)

| Test | Percentage |
|---|---|
| Fat | 7.63 |
| Protein | 19.65 |
| Moisture | 73.09 |

From these results, as shown in FIGS. 1-5, after the HPP'd robbed wing and HPP'd drumette skin was blended with the non-HPP'd skinless drumette, the color was very similar to non-HPP'd blended ground control skin, robbed wing, and skinless drumette. Grinding the drumette skin and robbed wing before or after the HPP process had no affect on the overall color of the blended ground product. Comparison of FIGS. 2 and 4 show marginal color degradation of the HPP process on the skin/robbed wing mixture compared to only the robbed wing portion. The efficacy of this test in reducing *Salmonella* could not be determined due to the controls in Table 2 and 3 having little to no positive results.

Therefore, further testing was needed to show that this process is effective in reducing *Salmonella*.

Example 2

A test was conducted to evaluate the efficacy of a 15 seconds dip and a 30 seconds dip in 250 ppm Peroxyacetic Acid (PAA, Inspexx) on skinless drumette and skinless drum and the efficacy of HPP'ing drumette skin and drum skin patches for three 30 seconds cycles at 450 MPa.

The materials used in this test were 30 bone-in drums, 30 bone-in drumettes, a bend top tumbler, a stop watch, and PPE: goggles, orange gloves, and a face shield.

The meat was prepared. All of the drums and drumettes were skinned. For the test samples, 10 drums and 10 drumettes were used for the 15 seconds dip in 250 ppm PAA, 10 drums and 10 drumettes were used for the 30 seconds dip in 250 ppm PAA, and 10 drum skin patches and 10 drumette skin patches were HPP'd. For the control samples, 10 drums and 10 drumettes were used for the control (were not dipped), and 10 drum skin patches and 10 drumette skin patches were used for the control (were not HPP'd).

The PAA was prepared. A solution of 250 ppm PAA was made by adding 17 mL of PAA to 3 gallons of water. Each sample type was separately placed in the bench top tumbler (2-3 per sample type) to be immersed in a solution of 250 ppm PAA and stirred in solution for 15 seconds or 30 seconds to ensure all meat came into contact with the solution. The samples were then place in Whirl-Pack bags. The control was not dipped in PAA or HPP'd. The PAA concentrations were measured before and after the samples were dipped.

On every other day after skinning the drums and drumettes, the test skin patches were sent via FedEx to be HPP'd the next day. For example, Friday's samples were shipped on Monday to be HPP'd on Tuesday. The HPP settings were three 30 seconds cycles at 450 Mpa. The control skin patches were sent to a lab along with the skinless drums and skinless drumettes for *Salmonella* analysis.

The *Salmonella* analysis was conducted by enriching the whole parts into buffered peptone water for 24 hours.

From these results, as shown in FIGS. 6 and 7, HPP'ing drum and drumette skin is effective at reducing the amount of *Salmonella* to very low levels, from 12.0% to 0.0% in drumette skin and from 15.0% to 1.0% in drum skin, with minimal visual or functional differences compared to non-treated ground meat. Dipping the skinless drumettes in 250 ppm PAA for 30 seconds reduces the *Salmonella* prevalence from 16.2% down to 7.0%. Dipping the skinless drums in 250 ppm PAA for 15 seconds decreases the prevalence from 12.0% down to 7.0%. The combination of HPP'ing the skin and treating the drum/drumette with PAA is an effective way to reduce the levels of *Salmonella* in the final mixed raw products. It is recognized that any suitable concentration of PAA could be used. For example, 500 ppm PAA could also be used.

The above specification, examples, and data provide a complete description of the manufacture and use of the composition of embodiments of the invention. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the invention. Therefore, it is manifestly intended that this invention be limited only by the claims and the equivalents thereof

The invention claimed is:

1. A method of producing bacteria reduced raw, fresh, ground meat products, comprising:
   obtaining a first portion of meat and a second portion of meat;
   treating the first portion with a treatment selected from the group consisting of grinding the first portion to create a ground first portion and then treating the ground first portion with HPP, and treating the first portion with HPP to create a HPP'd first portion and then grinding the HPP'd first portion;
   treating the second portion with a bacteria reducing chemical;
   grinding the second portion; and
   combining the first and second portions to create a bacteria reduced raw, fresh, ground meat product.

2. The method of claim 1, wherein the first portion is treated with HPP before it is ground.

3. The method of claim 1, wherein the first portion is treated with HPP after it is ground.

4. The method of claim 1, wherein the second portion is treated with the bacteria reducing chemical by an application technique selected from the group consisting of spraying, dipping, tumbling, vacuum tumbling, agitating, steaming, and massaging.

5. The method of claim 1, wherein the meat is a meat selected from the group consisting of turkey, chicken, duck, goose, pheasant, beef, pork, lamb, and alligator.

6. The method of claim 1, wherein the meat includes meat from a fowl including wings, drums, and thighs that are skinned to create skin and skinless parts.

7. The method of claim 6, wherein the first portion includes skin and trimmed wing meat and the second portion includes skinless parts.

8. The method of claim 6, wherein the skinless parts are treated immediately after skinning to limit contamination.

9. A method of producing bacteria reduced raw, fresh, ground fowl meat products, the fowl meat including meat including wings, drums, and thighs that are skinned to create skin and skinless parts, comprising:
   obtaining a first portion of fowl meat and a second portion of fowl meat, wherein the first portion includes skin and trimmed wing meat and the second portion includes skinless parts;
   treating the first portion with a treatment selected from the group consisting of grinding the first portion to create a ground first portion and then treating the ground first portion with HPP, and treating the first portion with HPP to create a HPP'd first portion and then grinding the HPP'd first portion;
   treating the second portion with a bacteria reducing chemical;
   grinding the second portion; and
   combining the first and second portions to create a bacteria reduced raw, fresh, ground fowl meat product.

10. The method of claim 9, wherein the first portion is treated with HPP before it is ground.

11. The method of claim 9, wherein the first portion is treated with HPP after it is ground.

12. The method of claim 9, wherein the second portion is treated with the bacteria reducing chemical by an application technique selected from the group consisting of spraying, dipping, tumbling, vacuum tumbling, agitating, steaming, and massaging.

13. The method of claim 9, wherein the skinless parts are treated immediately after skinning to limit contamination.

14. The method of claim 1, wherein the bacteria reducing chemical is selected from the group consisting of chlorine solutions, pH adjusted chlorine solutions, lactic acid solutions, peroxyacetic acid solutions, bromine solutions, and acetic acid solutions.

15. The method of claim 9, wherein the bacteria reducing chemical is selected from the group consisting of chlorine solutions, pH adjusted chlorine solutions, lactic acid solutions, peroxyacetic acid solutions, bromine solutions, and acetic acid solutions.

* * * * *